United States Patent [19]

Hashimoto

[11] Patent Number: 5,555,289
[45] Date of Patent: Sep. 10, 1996

[54] TELEPHONE ANSWERING DEVICE WITH OPERATING STATUS CONFIRMATION MEANS

[75] Inventor: Kazuo Hashimoto, Tokyo, Japan

[73] Assignee: Hashimoto Corporation, Tokyo, Japan

[21] Appl. No.: 408,525

[22] Filed: Mar. 22, 1995

[30] Foreign Application Priority Data

Mar. 22, 1994 [JP] Japan ..................... 6-073750

[51] Int. Cl.⁶ .................................................. H04M 1/64
[52] U.S. Cl. ............................. 379/67; 379/74; 379/80
[58] Field of Search ................................. 379/67, 70, 79, 379/81, 82, 102, 105, 80, 74, 77, 52, 61

[56] References Cited

U.S. PATENT DOCUMENTS

| | | | |
|---|---|---|---|
| 4,734,929 | 3/1988 | Hashimoto | 379/80 |
| 4,821,311 | 4/1989 | Hashimoto | 379/88 |
| 4,837,803 | 6/1989 | Hashimoto | 379/77 |
| 4,837,809 | 6/1989 | Hashimoto | 360/96.3 |

FOREIGN PATENT DOCUMENTS

| | | |
|---|---|---|
| 1345023 | 1/1974 | United Kingdom . |
| 2013069 | 8/1979 | United Kingdom . |
| 2046058 | 11/1980 | United Kingdom . |

*Primary Examiner*—Jeffery Hofsass
*Assistant Examiner*—Fan Tsang
*Attorney, Agent, or Firm*—Lowe, Price, LeBlanc & Becker

[57] ABSTRACT

The present invention is directed to provide a means for indicating an incoming message recording mode of a telephone answering device, such as a fixed or variable mode, by means of a distinguishable audible signal, which is outputted to speaker 9 or telephone line L1,L2 via output port O-6, on the following occasions: when one of the mode keys of console 2 is manually operated; when the telephone answering device is set to automatic answer mode by the "AUTO" key operation; and when a predetermined signal entered remotely is received through telephone line L1,L2, line transformer, amplifier 12 and tone decoder 13. Such a predetermined signal is also used to switch the recording mode by remote control.

11 Claims, 4 Drawing Sheets

TELEPHONE ANSWERING DEVICE WITH OPERATING STATUS CONFIRMATION MEANS

BACKGROUND OF THE INVENTION

The present invention relates to a telephone answering device with a means for indicating its operating status.

Heretofore, there were roughly two modes for recording incoming messages on telephone answering devices. The first was a fixed length recording mode ("fixed" mode), in which recording time was limited to a fixed duration such as 30 seconds. The second was a variable length recording mode ("variable" mode), in which an incoming message was recorded until the caller hung up. Typically, a sliding switch was used to select one of the two modes.

However, if a user left home without remembering to check the recording mode of the telephone answering device, there were occasions in which the recording medium was used up too quickly because the device had been left in variable mode. This was most likely to happen if the user remained away from home for a long time.

SUMMARY OF THE INVENTION

The present invention is directed to provide a means for indicating which incoming message recording mode is in effect on the following occasions: when the device is set to automatic answer mode; when the recording mode of the device is changed; or when a predetermined signal which was entered remotely is received.

In order to achieve the above objective, the present invention provides means for switching between fixed and variable modes. It also has a means for indicating the recording modes using easily distinguishable audible signals or voice synthesis when 1) the recording modes are switched, 2) the telephone answering device is set to answer mode, or 3) a predetermined signal is received from a remote telephone.

With regard to the third occasion, in addition to indication of a recording mode which has been set, the present invention allows the user to switch the recording mode and check the newly switched mode by transmitting another predetermined signal from the remote telephone.

Legend
1=CPU
2=Console
3=OR gate
4=Tape controller
5=Backup Battery
6=Microphone
7=OGM recording and playback unit
8=Amplifier
9=Speaker
10=ICM recording and playback unit
11=ICM tape
12=Amplifier
13=Tone decoder
14=Line monitor
15=Line transformer

DESCRIPTION OF THE PREFERRED EMBODIMENT

Figure 1:
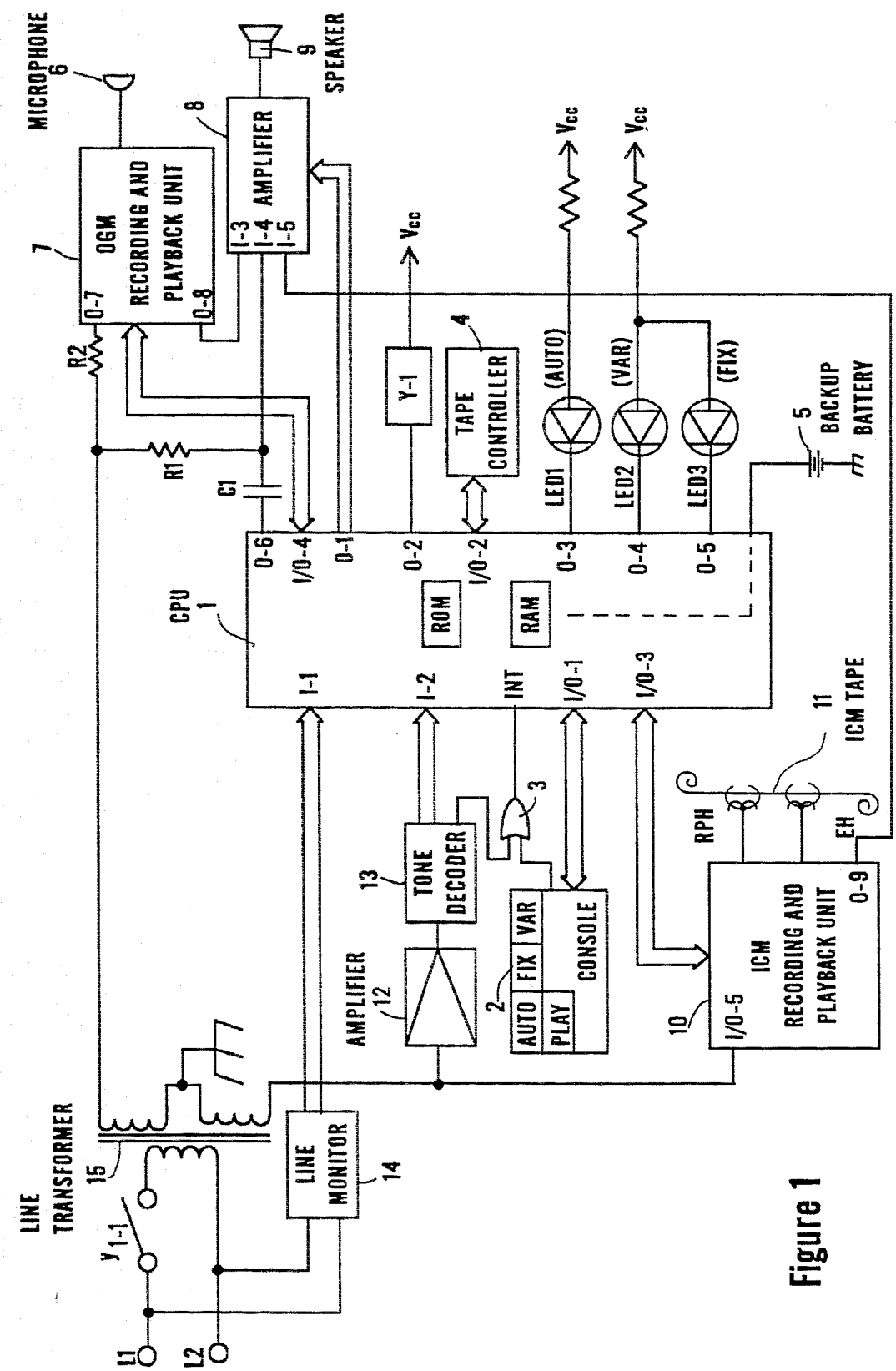
FIG. 1 is a block diagram illustrating one embodiment of the present invention.

An embodiment of the present invention will be subsequently explained with reference to FIGS. 1 through 4. FIG. 1 is a block diagram. Numeral 1 refers to a microprocessor (CPU) which has ROM for storing the device's program and RAM for storing data indicating whether the device is in "fixed" mode or "variable" mode. Symbols I-1 and I-2 refer to input ports, O-1 through O-6 to output ports, and I/O-1 through I/O-4 to input/output ports. Symbol INT is an interrupt terminal.

Numeral 2 is a console section which has the following keys: "AUTO" key for setting the present device to answer mode; "FIX" key for setting the present device to fixed mode; "VAR" key for setting the present device to variable mode; "PLAY" key for playing back callers' messages; and various other keys which are not shown on the diagram. Output from the foregoing keys is applied to input/output port I/O-1.

Numeral 3 is an OR gate. Numeral 4 is a tape controller for driving incoming message (ICM) tape 11, which will be described later. This tape controller is controlled by a command from input/output port I/O-2. Numeral 5 is a backup battery for the aforementioned RAM. Numeral 6 is a microphone for recording outgoing messages (OGMs). Numeral 7 is an OGM recording and playback unit. It is comprised of an integrated circuit which is controlled by a command from input/output port I/O-4.

Numeral 8 is an amplifier which amplifies incoming messages (ICMs) from callers and the aforementioned OGMs. It also amplifies the audible signals which are used to distinguish the aforementioned fixed mode and variable mode. Numeral 9 is a speaker.

Numeral 10 is an ICM recording and playback unit for recording and playing back incoming messages from callers. This unit is connected to recording and playback head RPH and erase head EH. This unit is controlled by a command from input/output port I/O-3. Numeral 11 is an ICM tape which can be a microcassette tape for example.

Numeral 12 is an amplifier used for amplifying the predetermined signals which will be described later. Numeral 13 is a tone decoder for decoding the predetermined signals (in the present embodiment, DTMF signals). Output of the tone decoder is applied to CPU-1. Numeral 14 is a line monitor which is used to detect ringing signals or an on-hook condition of caller's telephone (not shown in the diagram). Output of this line monitor is applied to CPU-1.

Numeral 15 is a line transformer for coupling the present device with telephone line L1, L2. Symbol Y-1 is a relay for engaging the telephone line. It has contact yl-1. Symbols LED-1 through LED-3 are light omitting diodes which are respectively lit when the device is set to answer, variable or fixed mode.

Explanation of Operations when Recording Mode is Switched by Switching Means

Figure 2:
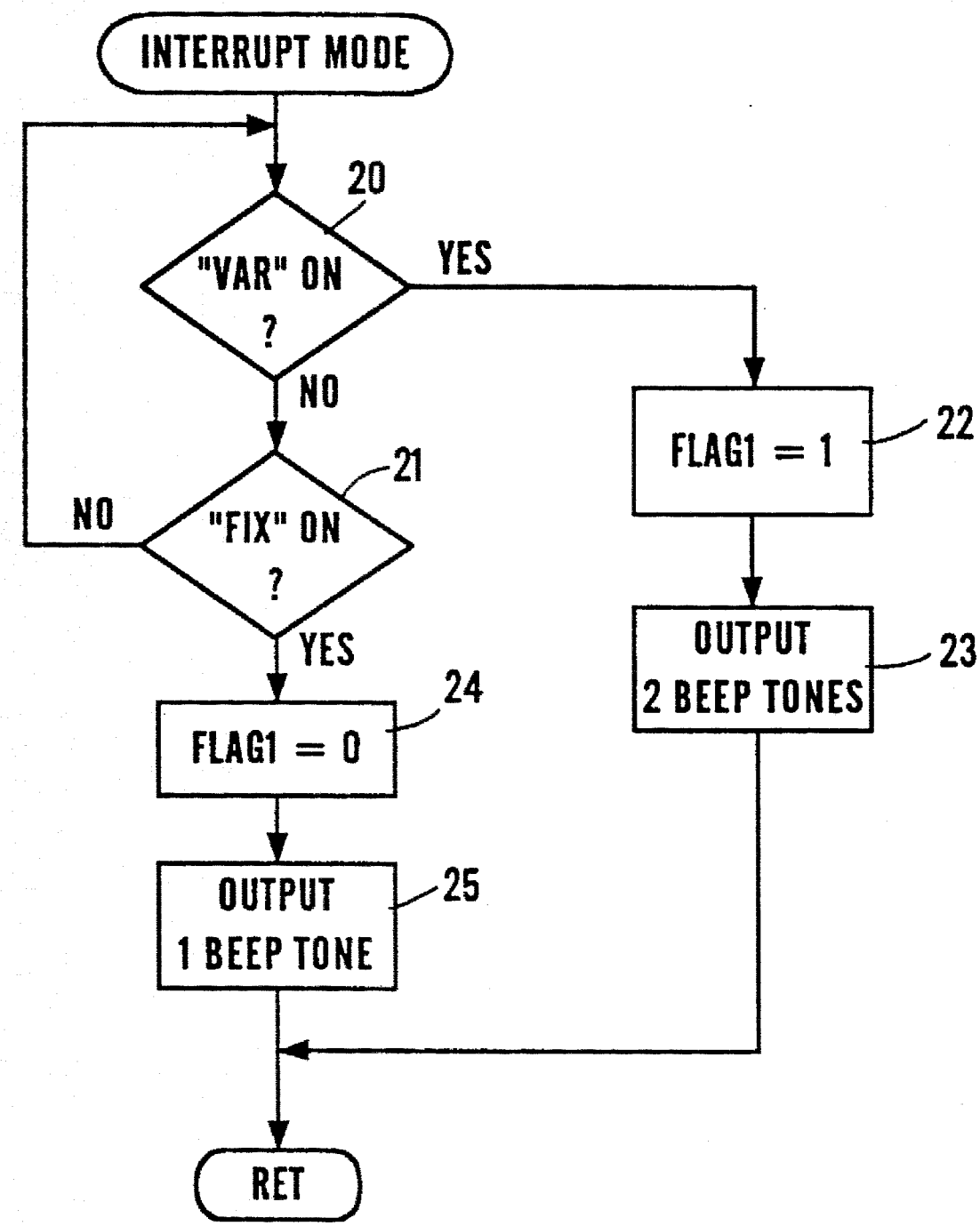
FIG. 2 is a flowchart illustrating operations which are performed when the recording mode is manually switched.

With reference to FIGS. 1 and 2, the following is a description of operations which take place when the recording mode of the present device is selected by means of the FIX ("fixed") key or VAR ("variable") key. These keys are provided in the console section 2 shown in FIG. 1.

If the FIX or VAR key is pressed, an interrupt is received at CPU-1 through OR gate 3 and the subroutine shown in the flowchart of FIG. 2 is invoked. A test takes place using input/output terminal I/O-1 to determine which key was pressed.

For example, assuming VAR is pressed, Step 20 will be affirmative. Next, at Step 22, FLAG1 will be set to "1" (this data will be stored in the RAM). In order to notify the user that the device has been set to variable mode, CPU-1 outputs a beep tone two times through output port O-6 at Step 23. The beep tones are amplified and outputted onto speaker 9 by means of capacitor C-1 and amplifier 8. Instead of the two beep tones, a voice synthesizer may be used to announce the word "variable."

If, on the other hand, the "FIX" key is pressed, Step 21 will be affirmative and the aforementioned FLAG1 will be set to "0" at Step 24. In order to notify the user that the device has been set to fixed mode, a beep tone will be outputted once and amplified at Step 25. It is also possible to have a voice synthesizer announce the word "fixed."

As mentioned earlier, in the present embodiment, variable mode is indicated by LED-2 and fixed mode is indicated by LED-3. However, these LEDs are not absolutely necessary because the aforementioned modes are indicated by audible signals.

The aforementioned mode switching operations may be performed either before or after answer mode (to be described later) is set.

Explanation of Operations Performed to Check the Recording Mode and its Corresponding Outgoing Message With the present invention, it is possible to check whether the device is in fixed or variable mode and to check which of the two outgoing messages (one is for the fixed mode, the other for the variable mode) is set either at the time the device is set to answer mode or thereafter.

Figure 3:
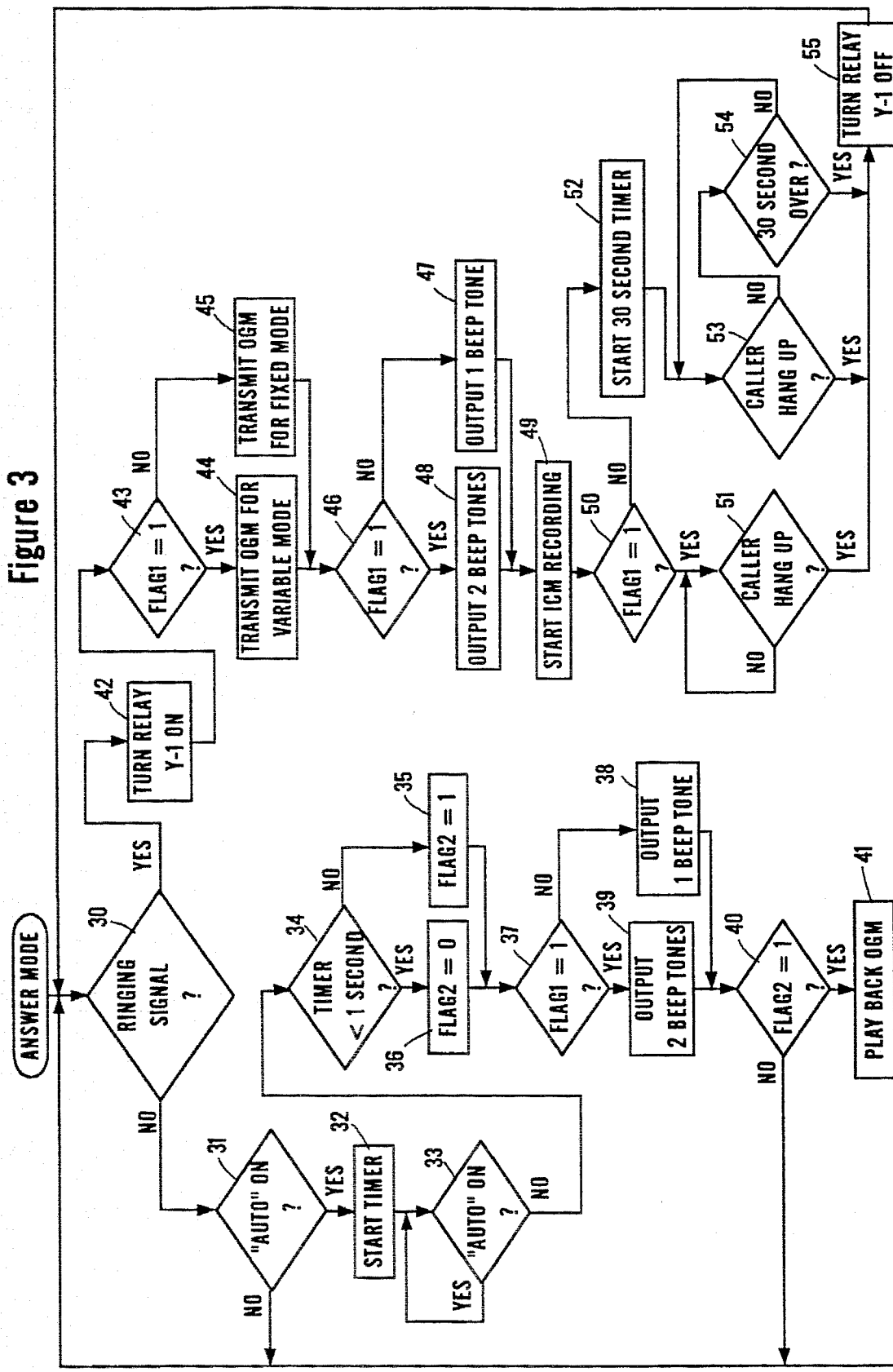
FIG. 3 is a flowchart illustrating operations which are performed when the present device is set to answer mode or at any time thereafter.
Figure 4:
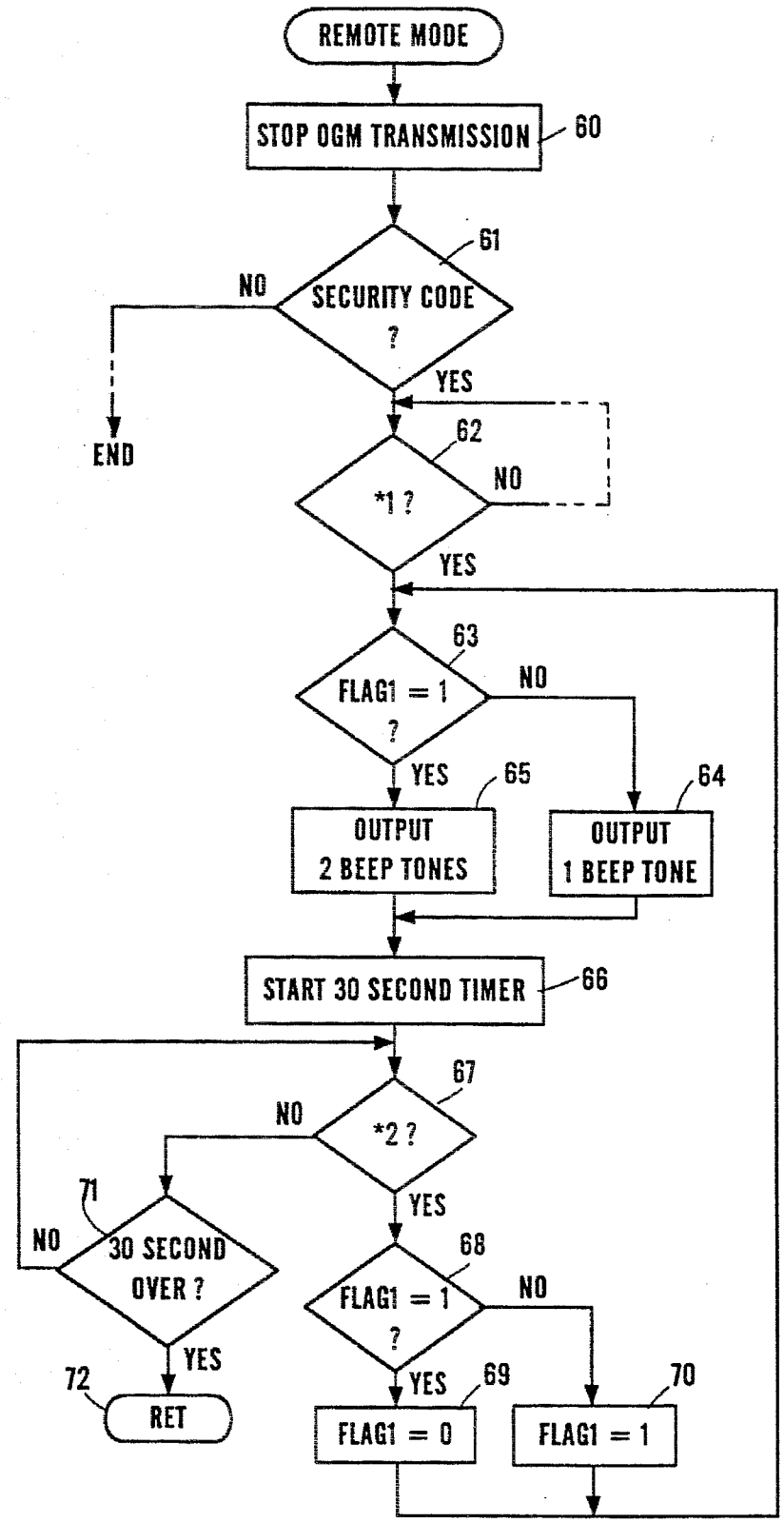
FIG. 4 is a flowchart illustrating remote confirmation of recording mode and remote switching of recording mode.

More specifically, when an "AUTO" key is held down, the subroutine shown in the flowchart of FIG. 3 is invoked. Step 30 represents a standby condition in which the present device awaits the arrival of ringing signals. Assuming that there are no ringing signals at this time, Step 30 will be negative. If the "AUTO" key is still being held down, Step 31 will be affirmative.

At Step 32 a timer, which is contained in CPU-1, is started. At Step 33 a test takes place to determine whether the "AUTO" key has been released. At the next Step 34, another test takes place to determine whether the "AUTO" key had been held down for less than one second or longer than one second.

If the time period is less than 1 second, Step 34 will be affirmative. At Step 36, FLAG2 is then set to "0." At Step 37, the value of FLAG1 is tested to determine whether the present device is in fixed mode or variable mode.

For example, if the present device is in variable mode, Step 37 will be affirmative because FLAG1 has value "1." Then in Step 39 CPU-1 outputs a beep tone twice through output port O-6. The beep tones are amplified and outputted onto speaker 9 by means of capacitor C-1 and amplifier 8.

On the other hand, if the present device is in fixed mode, Step 37 will be negative because FLAG1 has value "0." A single beep tone is then amplified and outputted onto the speaker at Step 38. If FLAG2 has value "0," in other words, if the "AUTO" key had been released within 1 second of being pressed, Step 40 will be negative and the program returns to a standby condition at Step 30.

When FLAG2 is "1" in other words if the "AUTO" key had been held down for over 1 second before it was released, Step 40 will be affirmative. An outgoing message (OGM) corresponding to the value of FLAG1 will be played back at Step 41, and then the program will return to a standby condition at Step 30.

Incidentally, the aforementioned outgoing message (OGM) is stored in recording and playback unit 7 and played back in accordance with a command from input/output port I/O-4. It is amplified by amplifier 8 and outputted onto speaker 9.

Explanation of Operations when There Is a Call During Answer Mode

When a call is received during answer mode, ringing signals will be detected at Step 30 through line monitor 14. After Step 30 is determined to be affirmative, relay Y-1 is turned on at Step 42. Since its contact y1-1 closes and the telephone line L1,L2 is engaged via line transformer 15, the ringing signals stop and a speech mode between the present device and the calling side is established.

At Step 43, the value of FLAG1 is tested. It may be recalled that FLAG1 is set at either Step 22 or Step 24. If FLAG1 is "0," Step 43 will be negative. At Step 45, an outgoing message indicating that the device is in fixed mode will be transmitted from the OGM recording and playback unit by means of its output port O-7, resistor 2 and line transformer 15. Such a message may inform the caller that recording time is limited to 30 seconds, for example.

If FLAG1 is "1, " Step 43 will be affirmative and Step 44 an outgoing message indicating variable mode will be transmitted. It should be noted that as an alternative, one combination outgoing message can be used in place of the above-mentioned two outgoing messages.

When transmission of the outgoing message is concluded, the value of FLAG1 is tested at Step 46. If the present device is in fixed mode, a single beep tone will be transmitted at Step 47 by means of output port O-6 of CPU-1, capacitor C1, resistor R-1 and line transformer 15.

If the present device is in variable mode, a beep tone will be outputted twice at Step 48.

After transmission of a beep tone or beep tones as the case may be, recording of a caller's incoming message commences at Step 49. Tape controller 4 drives ICM tape 11 in accordance with a command from input/output port I/O-2 of CPU-1. In accordance with a command from input/output port I/O-3, ICM recording and playback unit 10 starts recording.

At Step 50, a test is then performed to detect the recording mode. When the present device is in fixed mode, a timer of fixed duration, 30 seconds for example, will be started at Step 52. The caller can then record an incoming message on ICM tape 11 until the 30 second timer elapses at Step 54.

If the caller places his or her telephone (not shown in the drawings) on hook within 30 seconds, the resulting change in telephone line voltage will be detected by means of line monitor 14. As a result Step 53 will become affirmative. If either Step 53 or Step 54 is affirmative, relay Y-1 is turned off and the present device returns to a standby condition at Step 30 in which it awaits further ringing signals.

If the present device is in variable mode, a caller's incoming message will be recorded until his or her handset is placed on hook. However, it is also possible, for example, to provide a four minute timer and limit the recording length as in the case of the 30 second timer. In order to release the answer mode, a key of console section 2, such as a "PLAY" key (not shown in the drawings), should be pressed.

Explanation of Remote Operations for Checking and Changing the Mode

It is possible to check the recording mode of the present device using a remote telephone. It is also possible to change the recording mode and verify the changed mode. These operations will be described with reference to the flowchart of FIG. 4.

When a ringing signal is received on the present device, an outgoing message is transmitted. During transmission of the outgoing message, if a caller, using a remotely located DTMF tone telephone (not shown), enters a security code which was pre-registered using console 2, those tones will be detected by means of line transformer 15, amplifier 12 and tone decoder 13. For example, if a number such as "123" is entered, the subroutine shown in the flowchart of FIG. 4 will be invoked upon detection of the leading edge of the signal corresponding to the first digit.

First, at Step 60, operation of OGM recording and playback unit 7 is terminated in accordance with a command from input/output port I/O-4, whereby transmission of the outgoing message is cancelled. At Step 61, a test is performed to determine whether the inputted number matches the security code. If so, Step 61 will be affirmative.

Next, when a predetermined command signal (for example, "*1") is sent by the user in order to check the recording mode, Step 62 will be affirmative. At Step 63, a test is performed to determine the value of FLAG1.

If the present device is in fixed mode, a single beep tone will be outputted from CPU-1 through output port O-6, capacitor C-1, resistor R-1 and line transformer 15 at Step 64. On the other hand, if the present device is in variable mode, a beep tone will be outputted twice at Step 65. Therefore, the caller can distinguish which of the two modes is in effect.

At Step 66, a 30 second timer is started. If the caller would like to change the recording mode, he should enter another predetermined signal (for example, "*2") before the timer elapses at Step 71.

If Step 67 is affirmative, the value of FLAG1 will be tested at Step 68. The recording mode will be changed at either Step 69 or Step 70, depending on the value of FLAG1. The program then returns to Step 63, thereby enabling the user to verify the changed mode and to make further changes if necessary.

The subroutine is exited after 30 seconds.

Although it is not shown in the flowchart, while the 30 second timer is running or thereafter, it is possible to use other remote control features of the present device such as listening to incoming messages which may have been recorded on ICM tape 11.

It should be noted that in the present embodiment, two keys, "variable" and "fixed," are used. However, it is possible to use a single toggle switch instead. Furthermore, since audible signals are used to distinguish which mode is in effect, LED-2 and LED-3 can be omitted if it is necessary to minimize component costs. Or, LED-2 and LED-3 may be used in combination with a display which displays the recording mode by means of liquid crystal.

As mentioned above, conventional telephone answering devices have two modes: a fixed mode in which recording is limited to a fixed length and a variable mode in which a message is recorded until a caller hangs up. With the present invention, a user can easily check which of the two modes is in effect because the present invention produces readily distinguishable audible signals (including voice synthesized signals) for that purpose. The current mode is confirmed at the time the device is set to answer mode by manual key operation or at any time thereafter. Furthermore, this confirmation can also be performed if the caller inputs a predetermined signal using a remote telephone. The present invention is thus of great practical value.

What is claimed is:

1. A telephone answering device with operating status confirmation means, wherein when a ringing signal is detected, a telephone line is engaged, an outgoing message is transmitted, and a message from a caller is recorded, said device comprising:

first control means for limiting recording length of an incoming message from a caller to a predetermined time period;

second control means for enabling recording of an incoming message from a caller until said caller places telephone on-hook;

means for switching between said first control means and said second control means;

means for indicating, by means of a distinguishable audible signal, which of said two control means is selected when said switching means switches said first and second control means for one to another; and means for indicating by means of an audible signal which of said two control means is selected when said device is set to answer mode, said audible signal corresponding to one of said two control means which is currently selected by said switching means.

2. A telephone answering device with operating status confirmation means, wherein when a ringing signal is detected, a telephone line is engaged, an outgoing message is transmitted, a message from a caller is recorded, and remote control by a caller can be performed, said device comprising:

first control means for limiting recording length of an incoming message from a caller to a predetermined time period;

second control means for enabling recording of an incoming message from a caller until said caller places telephone on-hook;

means for detecting at least one predetermine signal from a caller;

means for indicating which of said first and second control means is selected by means of a distinguishable audible signal in response to a code signal supplied by the caller and detected by said detecting means; and means for switching between said first control means and said second control means in response to detection performed by said detecting means, wherein said distinguishable audible signal is provided when said device is set into an answer mode.

3. A telephone answering device with operating status confirmation means as set forth in claim 2, wherein a caller can switch between said first and second control means by transmitting a predetermined signal after said caller confirms said first and second control means using said indicating means.

4. A telephone answering device comprising:

means for recording an incoming message, means for setting said recording means in a fixed message mode to allocate a fixed time interval for recording an incoming message during each telephone call, means for setting said recording means in a variable message mode to allocate a variable time interval for recording the incoming message during each telephone call, and means for providing a remote user with an audible signal to indicate whether said recording means is set in said fixed message mode or said variable message mode in response to a first predetermined signal supplied by the remote user via a telephone line wherein said audible signal is provided when said recording means is set into an answer mode.

5. The device of claim 4 further comprising means for switching said recording means between said fixed message mode and said variable message mode in response to a second predetermined signal supplied by the remote user via the telephone line.

6. The device of claim 4, wherein said indicating means provides a predetermined number of tone signals to indicate a message mode of the recording means.

7. The device of claim 4, wherein said indicating means provides an announcement to indicate a message mode of the recording means.

8. The device of claim 4 further comprising means for transmitting an outgoing message to the caller in response to initiation of a telephone call.

9. The device of claim 8, wherein said outgoing message is interrupted in response to a request for indication of the message mode from the caller.

10. The device of claim 4, wherein said recording means set in the variable message mode records the incoming message until a telephone call is terminated.

11. A method of receiving an incoming message from a remote user via a telephone line using a recording device, comprising the steps of:

(a) setting the recording device in a fixed message recording mode to record the incoming message during a fixed time interval or in a variable message recording mode to record the incoming message during a variable time interval, (b) providing the remote user with an audible signal to indicate whether the recording means is set in said fixed message recording mode or said variable message recording mode in response to a first predetermined signal supplied by the remote user wherein said audible signal is provided when said recording device is set into an answer mode, and (c) switching between said fixed message recording mode and said variable message recording mode in response to a second predetermined signal supplied by the remote user.

\* \* \* \* \*